Figure 1:
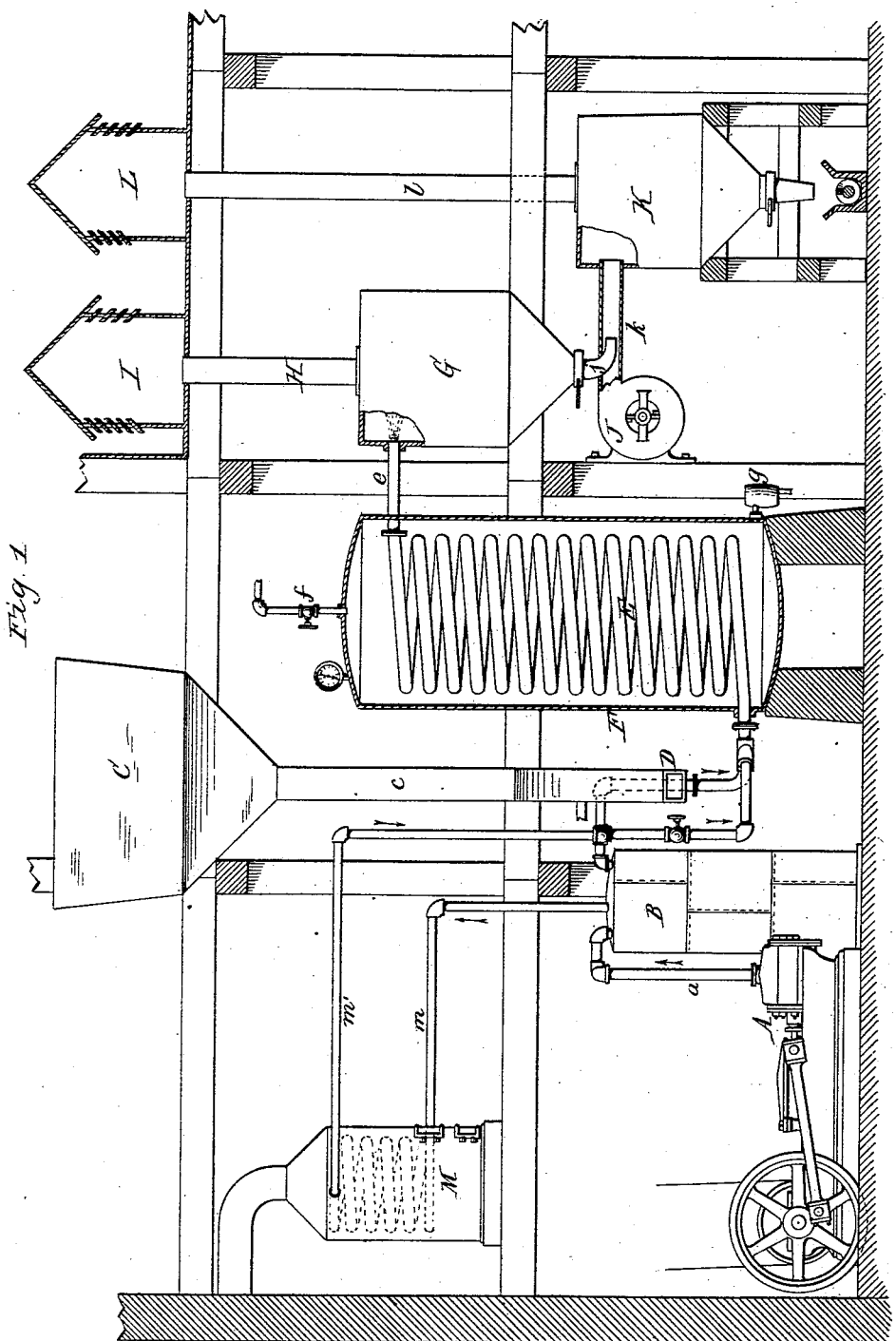

(No Model.)  J. C. SCHUMAN.  2 Sheets—Sheet 1.

METHOD OF TREATING STARCH AND OTHER SUBSTANCES.

No. 344,410.  Patented June 29, 1886.

(No Model.) 2 Sheets—Sheet 2.
J. C. SCHUMAN.
METHOD OF TREATING STARCH AND OTHER SUBSTANCES.
No. 344,410. Patented June 29, 1886.
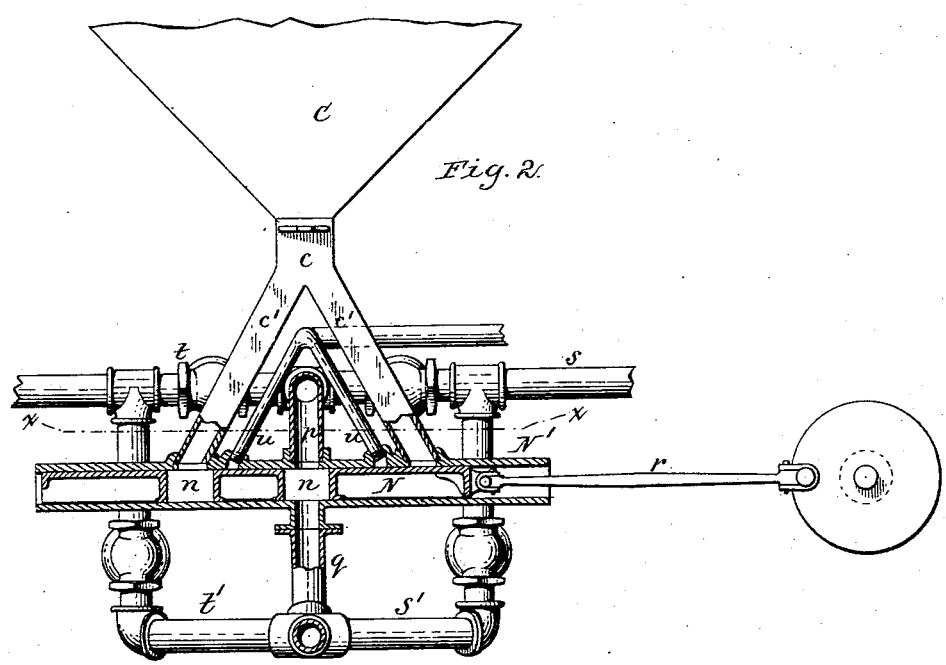
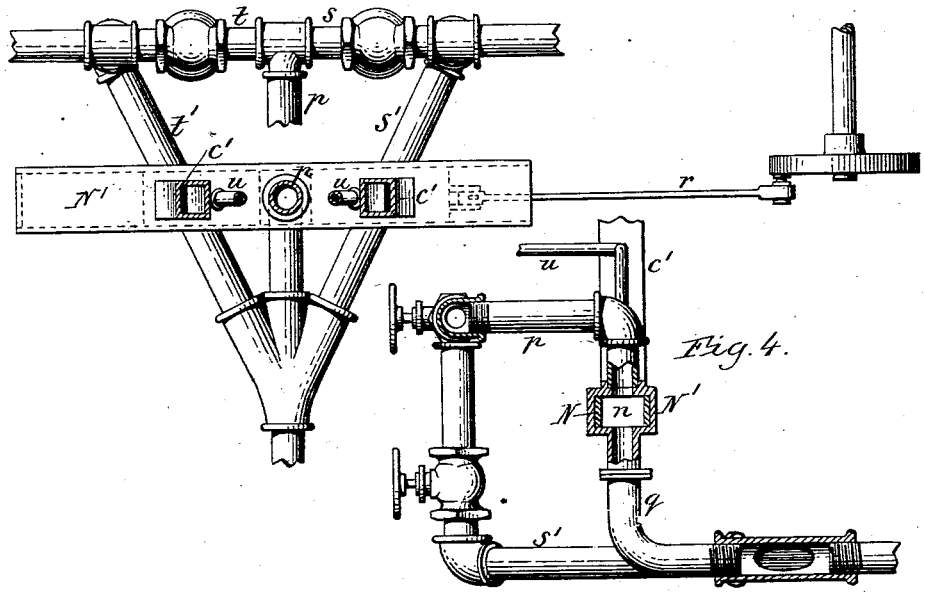

UNITED STATES PATENT OFFICE.

JOHN C. SCHUMAN, OF AKRON, ASSIGNOR TO WILLIAM T. JEBB, OF BUFFALO, NEW YORK.

METHOD OF TREATING STARCH AND OTHER SUBSTANCES.

SPECIFICATION forming part of Letters Patent No. 344,410, dated June 29, 1886.

Application filed November 2, 1885. Serial No. 181,594. (No model.)

*To all whom it may concern:*

Be it known that I, JOHN C. SCHUMAN, of Akron, in the county of Erie and State of New York, have invented new and useful Improvements in the Methods of Treating Starch and other Substances, of which the following is a specification.

This invention relates to an improved method of drying moist crude starch and other wet granular or reduced substances—such as grain, either whole or ground, wet bran, &c.—by conveying such substances, together with a suitable quantity of air, through a coil, pipe, or passage, in which the air absorbs the moisture of the substance under treatment.

Heretofore it has been proposed to employ a steam-jet for the purpose of propelling the substance to be dried and the air through the coil or passage; but this has been found impracticable, more especially when the substance to be dried is largely composed of starch, because the steam tends to convert the starch into dextrine, and even when no such conversion occurs the moisture of the steam causes the starch to become doughy and unfit for use or unsalable.

The object of my invention is to overcome the aforesaid difficulties; and it consists to that end, principally, in employing compressed air as the propelling power, whereby the air-current is caused to flow through the drying-passage, as will be hereinafter fully described, and pointed out in the claims.

In the accompanying drawings, consisting of two sheets, Figure 1 is a sectional elevation of a plant of machinery whereby my improved process can by practiced. Fig. 2 is a sectional elevation of the feed mechanism of the drier on an enlarged scale. Fig. 3 is a horizontal section in line *x x*, Fig. 2. Fig. 4 is a vertical section at right angles to Fig. 3.

Like letters of reference refer to like parts in the several figures.

A represents an air-compressor of any suitable or well-known construction. When the drying apparatus is of large capacity, I prefer to employ a cylinder compressor having a reciprocating piston; but for a small apparatus a rotary compressor may be employed.
B represents a receiver for the compressed air, which latter passes to the receiver from the compressor A through a pipe, *a*.

C represents the receptacle which contains the starch meal or other material to be dried, and from which the same is discharged through a spout, *c*, into the feed device D, by which the material is delivered at regular intervals into the air-passage E. The latter is preferably constructed in the form of a coil, which is arranged vertically in a heating tank or vessel, F.

The feed device D is connected with the lower end of the coil, and the upper end of the latter connects with a discharge-pipe, *e*, through which the air and the dried material are delivered into a receiving-bin, G.

The tank F is provided with a steam-supply pipe, *f*, and a steam-trap, *g*, for filling the tank with steam and heating the external surface of the coil E.

The receiving-bin G is provided with an escape-spout, H, through which the air, which is blown into the bin, escapes to a dust-room, I. In the latter the air-current comes to a state of comparative rest, which permits the fine dust which has been carried off to settle, while the air escapes through suitable ventilators.

The dried material which is deposited in the receiving-bin G may be cooled in any suitable manner. I prefer to cool it by means of a current of cold air, which is discharged from a blower, J, and into which the dried material is delivered by the discharge-spout *j* of the bin G entering the discharge-spout *k* of the blower. The spout *k* delivers the material into a receiving-bin, K, which is provided with an air-escape spout, *l*, leading to a dust-room, L.

M represents a heater consisting of a coil arranged over a furnace or constructed in any other suitable manner, and in which the compressed air can be heated before it enters the coil E. The air passes from the receiver B to the heater M through a pipe, *m*, and from the heater to the feed device D through a pipe, *m'*.

The feed mechanism D, which intermittently delivers the material to be dried into the air-passage, is preferably constructed in the following manner: The discharge-spout *c* terminates at its lower end in two branches, $c'$, from which the material passes alternately into two pockets, $n\,n$, of a reciprocating valve, N, which moves in a casing, $N'$. $p$ represents the air-pipe through which the current of air is delivered to the feeder, and $q$ is the discharge-pipe through which the current of air, together with the material to be dried, is delivered from the feeder to the receiving end of the coil E. The pipes $p$ and $q$ open, respectively, into the upper and lower sides of the case $N'$, centrally between the branches $c'$, and the pockets $n\,n$ register alternately with the branches $c'$ and the pipes $p\,q$, so that when a pocket registers with the branch $c'$ it becomes filled with material from the same, and upon registering with the pipes $p$ and $q$ the material is blown out of the pocket into the pipe $q$, and thence into the coil E. The valve N receives a reciprocating motion by a pitman, $r$, or any other suitable means. Any other suitable feeding device may be employed, if preferred. $s$ represents the pipe through which sufficient cold air is delivered to the pipe $p$ to blow the charge of material out of the valve into the air-passage, while the bulk of the air, which is required for propelling and drying the material, is delivered to the air-passage by the pipe $s'$, and does not pass through the feeder D, thereby avoiding loss of air by leakage of the parts of the feeder. $t$ represents the pipe through which sufficient hot air is delivered to the pipe $p$ to remove the charge from the valve, and $t'$ is the pipe through which the bulk of the hot air is delivered into the air-passage. These pipes are provided with suitable stop-cocks or valves, so that either cold or hot air may be used separately, or hot and cold air may be mixed, as the nature of the material to be dried may require. $u$ represents relief pipes or passages, through which the compressed air escapes from the pockets $n$ after the charge is delivered therefrom and before the pockets register again with the branches $c'$ of the feed-spout. The blast of air enters the drying coil or passage E from the feeder laden with the material to be dried, and passes through the coil with great velocity. While passing through the coil the air comes in intimate contact with every particle of the material to be dried, and absorbs the moisture therefrom, which operation is greatly facilitated and expedited by the atomizing or disintegrating action which the blast of air produces upon the material fed into the same. In this manner the material is thoroughly and uniformly dried in a very small space and in a very short period of time, and by a continuous operation, resulting in a stream of dried material and air which is continuously discharged from the discharge pipe $e$. As no steam or other moisture is admitted into the air-current, the latter is enabled to fully exert its drying action, and the process is thereby especially adapted for drying crude starch, or meal composed largely of starch, and other like substances, which would undergo a chemical change or dough up under the influence of heat and moisture.

In drying starchy substances it is desirable to keep the temperature of the heating-jacket F so low that the starch will not change its color by the heat, while in drying wet bran and other offal a high degree of heat, both in the air-current and the jacket surrounding the drying-coil will be found useful for expediting the operation of drying.

I claim as my invention—

1. The herein-described method of drying starch and other substances, which consists in feeding the material into a current of dry air and causing the air-current to propel the material through a pipe or passage in which the air absorbs the moisture from the material, substantially as set forth.

2. The herein-described method of drying starch and other substances, which consists in feeding the material into a current of heated air, and causing the air-current to propel the material through a pipe or passage in which the air absorbs the moisture from the material, substantially as set forth.

3. The herein-described method of drying starch and other substances, which consists in feeding the material into a current of air, causing the air-current to propel the material through a pipe or passage in which the air absorbs the moisture from the material by the aid of heat, and in cooling the dried material by feeding it into a current of cold air, substantially as set forth.

4. The herein-described method of drying starch and other substances, which consists in feeding the material into a current of air and causing the air-current to propel the material through a pipe or passage, which is heated, and in which the air absorbs the moisture from the material, substantially as set forth.

Witness my hand this 28th day of October, 1885.

J. C. SCHUMAN.

Witnesses:
 THOS. W. ADAMS,
 T. A. JEBB.